INVENTORS
ARTHUR J. WILTSHIRE, RALPH W. LOTZ
& ROGER B. WHITE
BY
W. G. Sullivan
ATTORNEY June 20, 1950 A. J. WILTSHIRE ET AL 2,512,535
APPARATUS FOR MOLDING RESINOUS ARTICLES
Filed Feb. 26, 1949 3 Sheets-Sheet 2

INVENTORS
ARTHUR J. WILTSHIRE, RALPH W. LOTZ
& ROGER B. WHITE
BY
W. G. Sullivan
ATTORNEY

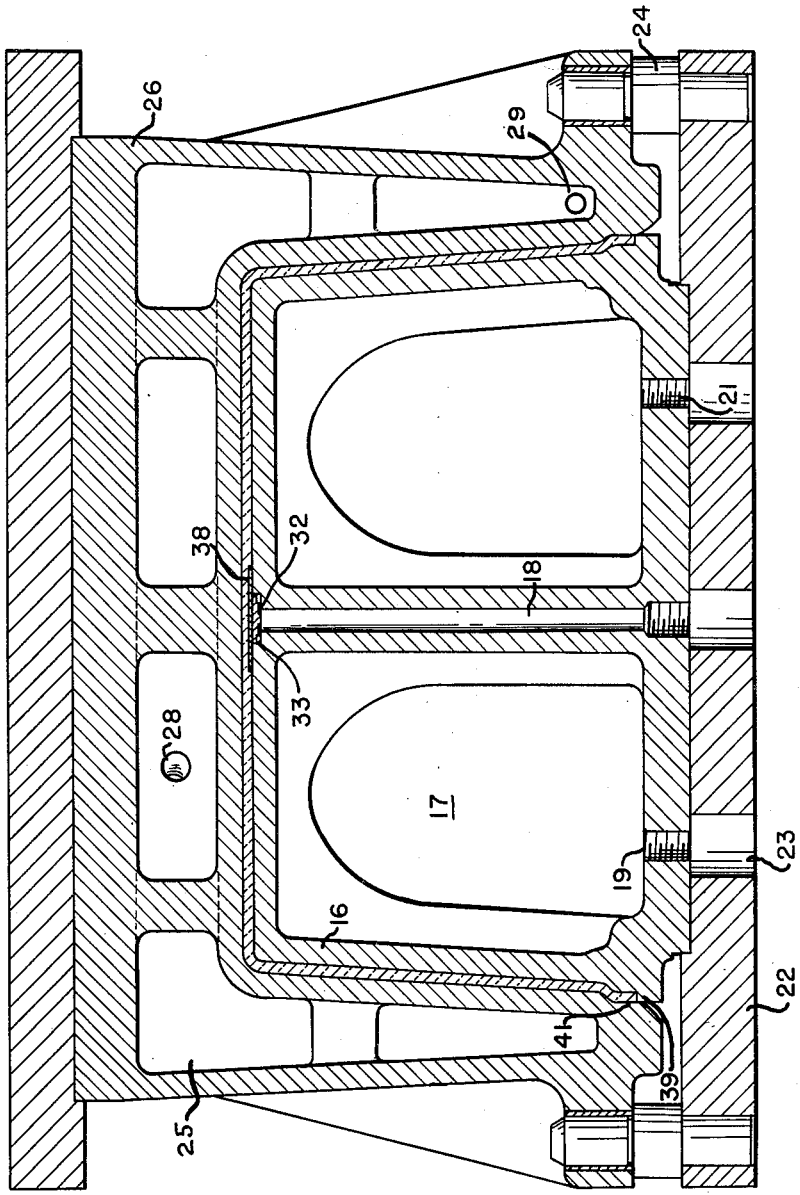

Patented June 20, 1950

2,512,535

UNITED STATES PATENT OFFICE 2,512,535

APPARATUS FOR MOLDING RESINOUS ARTICLES

Arthur J. Wiltshire, Richmond Heights, and Ralph W. Lotz and Roger B. White, Cleveland Heights, Ohio, assignors to The Apex Electrical Manufacturing Company, Cleveland, Ohio, a corporation of Ohio Application February 26, 1949, Serial No. 78,638

7 Claims. (Cl. 18—34)

This invention relates to apparatus for molding articles embodying resin, and more particularly to means and methods for ejecting articles of this type from a mold.

Today there is an increasing demand for articles embodying resin, and particularly articles comprising a reinforcing agent such as glass fibres and a bonding agent such as a thermosetting resin. The invention is equally adaptable to articles embodying a thermoplastic resin, but if the article may be subjected to heat it is desirable to use a resin which will not soften if the molding temperature of the article is again approached. Articles of the general type contemplated herein are frequently formed by applying a layer of short glass fibres to a preform, spraying a binding agent on the fibres, baking the fibres and binding agent to permit the shaped mass to be handled, placing the mass and a bonding resin in a mold and subsequently applying the heat and pressure to the mold parts to form the article. In many cases the article cannot be conveniently gripped for removal from the mold and it is necessary to provide pins working through the mold base or to introduce air under pressure between the article and mold to eject the article from the mold. The resin during the molding operation is in liquid form and is under pressure. Under these conditions, resin packs between the pins and the mold openings for the pins or is forced into the air entry port and air supply conduit rendering the ejection means inoperative when the resin hardens. If a thermosetting resin is used it is extremely difficult to remove, since the resin will not liquefy if again raised to its molding temperature and must be removed by chipping or burning.

We preferably employ air pressure means for ejecting articles of the above type from the mold, since the pressure is uniformly distributed over a relatively large area and any tendency to deform or damage the article by concentrated pressure of pins is avoided.

According to the invention an air entry port is provided in the base of the mold and a loose plug is inserted in the port to leave a small peripheral opening. A small sheet of cellophane or the like is placed over the port and extends peripherally beyond the port. The air pressure on the under side of the sheet is then reduced by a vacuum pump or the like communicating with the port to effectively seal the port opening by the sheet. The preshaped mass and bonding resin is then placed in one part of the mold, the mating part of the mold is brought into pressure contact with the mass, and after subjecting the mass to heat for a predetermined period the mold parts are separated. Preferably, prior to separating the mold parts, the vacuum line is closed and air under pressure is supplied to the port lifting the article as the mold parts are separated and as the plug is lifted the effective port area is increased.

The apparatus is arranged so that the mold parts cannot be brought into molding relation if an operator inadvertently omits to place the cellophane or the like strip on the mold part.

Another object of the invention is to provide improved means for ejecting articles of the above type from a mold.

Another object of the invention is to provide article ejection means in association with a mold together with means for sealing the ejection means against the entry of resin during the molding operation.

Another object of the invention is to prevent the mold from being closed unless the ejection means is sealed against the entry of resin.

Other objects of the invention and the invention itself will become increasingly apparent from a consideration of the following description and drawings, wherein:

Figure 3 is an enlarged vertical sectional view showing the mold parts in molding relation;

Figure 1:
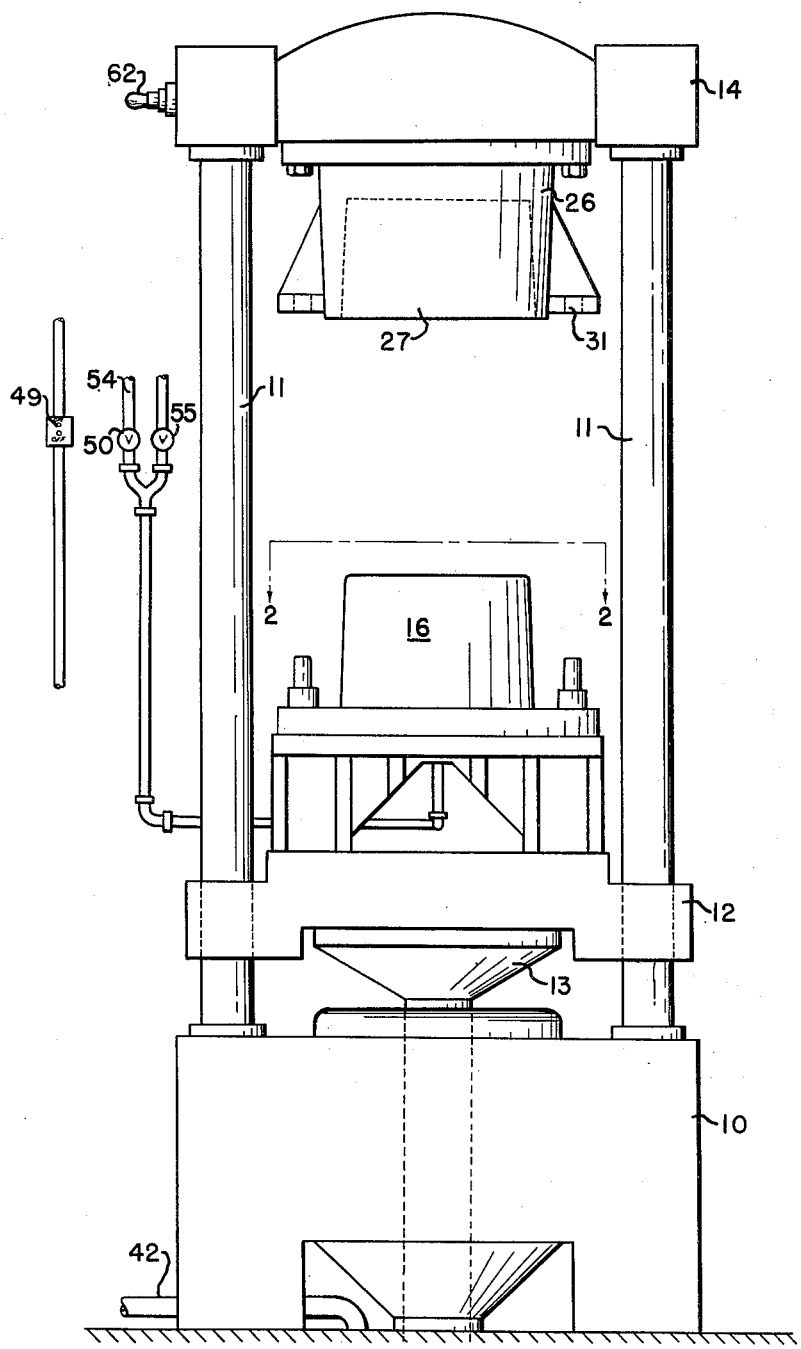
Figure 1 is an elevational view, largely diagrammatic, of a mold press which may be used in practicing the invention.
Figure 2:
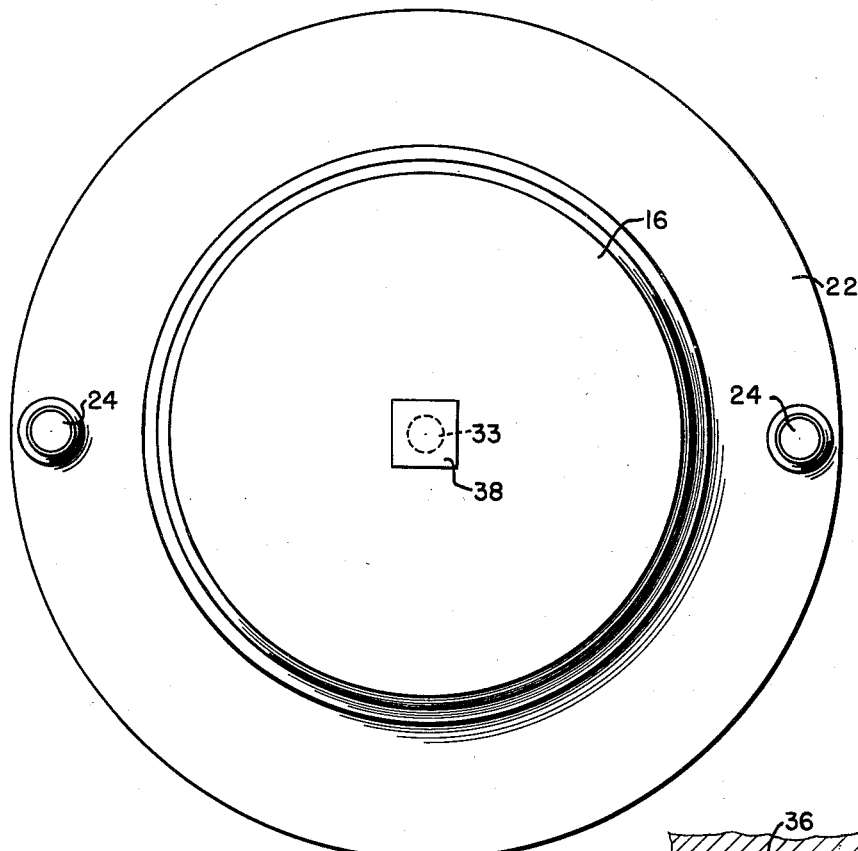
Figure 2 is a top plan view of the lower mold part taken along the line 2—2 of Fig. 1.

Referring now to the drawings, and particularly Fig. 1, we have indicated a conventional mold press which will be briefly described. The press comprises a base 10, a plurality of guide columns 11 along which a support member 12 for the lower mold part is vertically slidable, the member 12 being movable by a hydraulic ram 13, and the upper mold part being supported from a cross arm 14.

For purposes of illustration, we have shown mold parts adapted to form a relatively large basket for a washing machine, but the invention is equally adaptable to molds for forming articles of various shapes and sizes. The basket illustrated is approximately twenty-two inches in diameter and eight inches high. In molding an article of this type, a wire mesh preform conforming to the basket interior is provided and the preform is placed on a table in inverted position or with the open end down and short glass fibres are supplied to an enclosed space above the table. Ports in the table communicate with a vacuum fan whereby the fibres may be drawn around the preform in a compact layer of the desired thickness and a suitable binding agent, such as a thermosetting resin, is then sprayed on the fibres, and the layer of fibres and the preform are then heated whereby the binding agent causes the fibres to adhere to each other so that the basket or article in rough form can be removed from the preform as a unit. The manner of molding this preformed article will now be described.

The lower mold part 16 conforms to the interior of the basket and is hollow to form a steam chamber as indicated at 17. A tube extends centrally through mold part 16 providing a passageway 18 adapted to communicate either with a vacuum pump or a source of air under pressure as will be hereinafter explained. A port 19 in the base of mold part 16 admits steam to chamber 17 and the steam or condensate is exhausted through a port 21. The lower mold part 16 is secured to a mounting plate 22 by bolts (not shown). The plate 22 has openings as indicated at 23 for receiving flexible conduits which communicate with passageway 18 and ports 19 and 21. The plate also has a plurality of aligning pins 24 adapted to project through openings in the upper mold part 26 when the mold parts are closed. Plate 22 is suitably supported on slidable member 12.

The upper mold part is bolted to cross-arm 14 and is provided with a recess 27 adapted to mate with the lower mold part 16 to form an article of a desired thickness between the cooperating mold parts. Mold part 26 is also of hollow construction to provide a steam chamber 25, the steam entry port being indicated at 28 and the exhaust port at 29. The mold part 26 is provided with a plurality of flanges having openings 31 therein for receiving the aligning pins 24.

Figure 5:
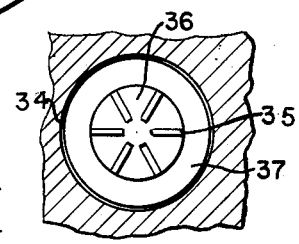
Figure 5 is an enlarged bottom view of a mold plug we may employ, showing the clearance between the mold and the plug.

The parts so far described are conventional except that passageway 18 or a plurality of such passageways would serve as a means for projecting pins through the lower mold part to eject the formed article from the mold. However, as previously pointed out, this method of ejecting articles embodying resin is unsatisfactory in that the resin is forced between the pins and the pin openings, rendering the ejection means inoperative. We provide an enlarged recess 32 which is relatively shallow in depth at the top of passageway 18. A plug or disc 33 seats in this recess to be normally flush with the top surface of mold part 16. As best indicated in Fig. 5, a slight clearance is provided between the disc and recess to leave an annular opening as indicated at 34. The bottom of disc 33 is provided with a plurality of radial ribs 35 which seat on the bottom surface of recess 32, the ribs providing segment shaped passages 36 which communicate with an annular undercut portion of the disc indicated at 37. As previously pointed out, we have found that air pressure, as a means ejecting the article, is desirable relative to pins in that the pressure is uniformly distributed. After the article is molded, the ram 13 is lowered and air under pressure is supplied to passageway 18 from a compressor or supply tank and the air flows through opening 34 lifting the article and permitting the air to flow laterally between the article and mold part 16. As the article is raised, disc 33 is lifted by the air pressure increasing the air discharge area. This means is effective for ejecting the article, but since some clearance is necessary between disc 33 and recess 32, we have found that during the molding process resin in liquid form will be forced through opening 34 into passageway 18 and, in some instances, into the air supply conduit communicating with passageway 18. Since, in many cases, it is desirable to use a thermosetting resin as a bonding agent, the resin after hardening cannot be removed except by chipping or burning. If a thermoplastic resin is used, it can be more easily removed in that it will revert to liquid form if heated to the liquefying temperature of the resin. However, in either case, the mold apparatus is rendered inoperative for a considerable period. To prevent entry of resin into the air conducting means, we provide a sheet of cellophane or the like 38 which is placed over disc 33 prior to placing the preformed article on mold part 16. Sheet 38 extends peripherally beyond disc 33 for a slight distance and may be of any desired shape and, in the present instance, we have shown sheet 38 as being square. Through suitable valve and conduit means, passageway 18 communicates with a vacuum pump or the like whereby the underside of sheet 38 will be subjected to a partial vacuum and the pressure differential on the sheet will effectively seal opening 34 and hold the sheet in proper sealing position. The preformed article is then placed on lower mold part 16, the bonding resin is applied to the mass, and the heated mold parts are brought together as illustrated in Fig. 1 to mold the article. The resin is preferably applied in liquid form by pouring the resin on the top surface of the preformed mass and the resin is temporarily held to a relatively small area by the glass fibres. The thermosetting resins used as a bonding agent for articles of this type have the property of being liquid at room temperature and if then they are subjected to a temperature such as 220° F. for a predetermined period, they will permanently harden and will not soften at a lower temperature or if again subjected to a temperature such as 220° F. While articles are being molded, the mold parts are kept heated at the desired molding temperature by steam or other suitable means. When the mold parts are brought into molding relation as indicated in Fig. 3, the combined heat and pressure distributes the resin in liquid form substantially uniformly throughout the preformed mass. After a predetermined interval, communication with the vacuum pump is cut off, and passageway 18 is placed in communication with a source of air under pressure to eject the molded article as previously explained. It will be noted that the cellophane or the like sheet 38 is slightly imbedded in the article and if desired the sheet can easily be removed by peeling the same from the article.

In order to prevent any tendency of the air pressure to deform the article we preferably apply the air pressure before the mold parts are separated and then slowly separate the mold parts so that air escapes between the article and mold part 16 before the mold parts are substantially separated.

The glass fibres of the preformed article extend somewhat beyond the open or lower end of the article, as illustrated in Fig. 3, and it will be noted that the mold parts at this zone are formed to provide a cutting edge which cuts off excess fibre material when the mold parts are brought together under pressure. In other words, the upper surface of peripheral flange 39 of the mold part 16 forms a knife edge and the cooperating vertical wall portion 41 of mold part 26 pinches the fibres against this knife edge. Although the cutting portions described are illustrated as being formed of the same material as the mold parts, in actual practice we prefer to make these portions of a different metal which is highly resistant to abrasion by the glass fibres.

Figure 4:
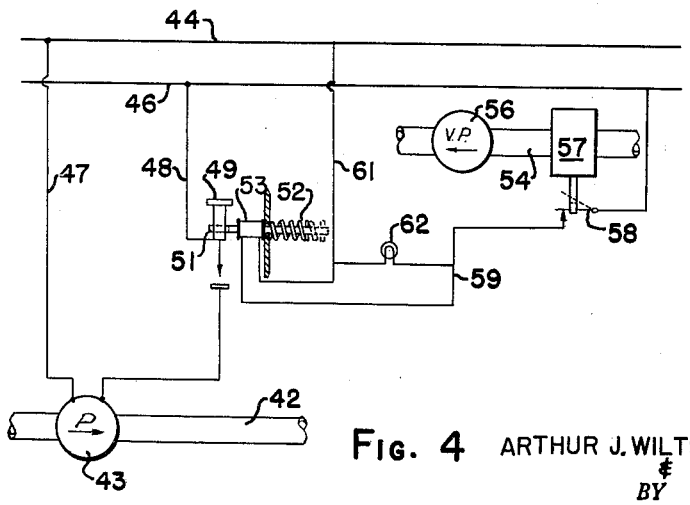
Figure 4 is a wiring diagram which we may employ.

It is important that the mold parts be prevented from closing or being brought into molding relation in the event an operator inadvertently omits to place strip 38 over plug 33 and means for achieving this result are illustrated in Fig. 4. The hydraulic line communicating with ram 13 is indicated at 42 and a liquid pressure pump in the line is indicated at 43. For convenience, we have illustrated a pump adapted to be started and stopped when pressure is desired or discontinued, but a continuously operating pump could be employed and a valve would be placed in the line ahead of the pump. Two main electrical power leads are indicated at 44 and 46, a line 47 extends from lead 44 to one terminal of the pump motor, and the motor is adapted to be energized when a circuit is completed through a second line 48 extending from the other terminal of the motor to the lead 46. A push button switch 49 is adapted to complete the circuit through line 48, the button having a transverse opening therethrough adapted to receive a pin 51 which prevents the switch from being closed. A compression spring 52 urges pin 51 to the right (as viewed in Fig. 4) or out of contact with the switch push button. Pin 51 extends through and forms the core of a solenoid 53 whereby when the solenoid is energized the pin will be forced to the left (as viewed in Fig. 4) against the spring force and will engage the push button to prevent switch 49 from being closed. The vacuum line which communicates with passageway 18 of lower mold part 16 is indicated at 54 and a vacuum pump is indicated at 56 whereby when the pump is operated a partial vacuum will be created in passageway 18. A conventional switch operable by air pressure differential includes a housing indicated at 57, the housing provides a chamber having a snap-acting diaphragm forming one wall thereof and this chamber is in communication with vacuum line 54. The opposite side of the diaphragm is subjected to atmospheric pressure whereby when the chamber pressure is reduced to a predetermined value the diaphragm will snap and open a switch indicated at 58. This switch is included in a line 59 extending from power lead 46 to the solenoid and the solenoid circuit is completed through a line 61 extending from the solenoid to power lead 44 whereby when switch 58 is closed the solenoid 53 is energized and the push button switch 49 cannot be operated to start the pump 43 or open a valve controlling liquid flow through line 42 to ram 13. If the operator has placed strip 38 over plug 33 a vacuum will be drawn in line 54 and switch 58 will be opened, de-energizing solenoid 53 and permitting spring 52 to force pin 51 out of engagement with the push button which will permit switch 49 to be closed to elevate ram 13. The capacity of vacuum pump 56 relative to the low pressure required in the chamber of housing 57 in order to open switch 58 is such that a sufficient reduction in pressure cannot be effected in line 54 unless strip 38 is in sealing position covering plug 33. It will now be apparent that unless a seal is effected preventing entry of resin to the ejection means that the mold parts cannot be brought together or into molding relation. As an additional safeguard, we preferably provide a red warning light 62 connected to lines 59 and 61 whereby when switch 58 is closed the light will be lit, indicating that a seal is not being effected or that strip 38 has not been placed over plug 33. A valve 50 controls communication of mold passageway 18 with the vacuum pump and a valve 55 controls communication of this passageway with a source of air pressure.

Although we prefer to use air pressure as the ejection means, particularly for large articles, it will be apparent that pin means could be used for ejecting articles and the invention is equally adaptable to pin type ejection means. For example, a pin could be projected through passageway 18 of mold part 16 to normally permit plug 33 to be flush with the top surface of mold part 16 and when the pin is elevated by any suitable means plug 33 would be elevated to eject or loosen the article from the mold. Of course, after the vacuum between the article and the mold part 16 is broken, it is relatively easy to remove the article. In the event pin ejection means is used, we prefer that the pin is not directly connected to plug 33 but that the pin merely loosely abut the plug.

It will now be understood that we have provided means in association with a mold for forming articles embodying either a thermosetting or a thermoplastic resin whereby during the molding operation the ejection means will be sealed against the entry of resin thereto which would otherwise render the ejection means inoperative. Although we have described the article as comprising reinforcing fibres of glass or the like, it will be appreciated that the invention is equally adaptable to an article formed entirely of resin.

We wish it to be understood that we do not desire to be limited to the exact details of construction shown and described, for obvious modifications will occur to a person skilled in the art.

What is claimed is:

1. The combination with a mold for forming articles comprising resin by heat and pressure, said mold having ejection means for the formed article including an opening in the mold, of means for sealing the opening against the entry of resin during the molding operation, said means comprising a thin sheet of sealing material adapted to cover said opening, and means for reducing air pressure in the opening substantially below atmospheric pressure whereby the sheet may be held in peripheral sealing contact with the mold portion surrounding the opening during the molding operation.

2. The combination as described in claim 1, and wherein said opening is formed by a freely movable plug seated in a recess to provide a narrow continuous passage between the side walls of the plug and recess.

3. The combination described in claim 1, and wherein conduit means effects communication between said opening and a vacuum pump whereby the air pressure on the underside of the sealing strip may be reduced.

4. The combination described in claim 1, and wherein a source of air under pressure and a vacuum pump are provided, conduit means extend from said opening to said source and pump, and valve means in the conduit means are adapted to selectively effect communication between said opening and said source or pump whereby the ejection means may be sealed against the entry of resin during the molding operation and after molding air pressure may be exerted against the molded article to eject the same from the mold.

5. The combination with a multi-part mold for forming articles comprising resin, the mold parts being adapted to be heated and brought into molding relation under pressure, said mold having ejection means for the formed article including an opening in the mold, of means for sealing said opening against the entry of resin during the molding operation, said means comprising a thin sheet of sealing material adapted to cover said opening, a vacuum pump, conduit means extending from the pump to said opening, and means preventing the mold parts from being brought into molding relation until said opening is sealed.

6. The combination as described in claim 5, and wherein closing movement of the mold parts is effected by closing an electric switch, a pressure responsive device communicates with the conduit means and is operably responsive to a predetermined low pressure in the conduit means, and means responsive to operation of the pressure responsive device preventing closing of the switch until said predetermined low pressure is attained in the conduit means.

7. The combination as described in claim 5, and wherein a pressure responsive switch is operably responsive to a predetermined low pressure in the conduit means, and a warning light is in circuit with said switch whereby said light remains lit until said predetermined low pressure is attained.

ARTHUR J. WILTSHIRE.
RALPH W. LOTZ.
ROGER B. WHITE.

REFERENCES CITED

The following references are of record in the file of this patent:

UNITED STATES PATENTS

| Number | Name | Date |
|---|---|---|
| 2,023,002 | Bosomworth | Dec. 3, 1935 |
| 2,304,190 | Milner | Dec. 8, 1942 |
| 2,396,406 | Anderson | Mar. 12, 1946 |